CESARE CANEVARI
INVENTOR 3,514,370
ZINC LAMINATE AND METHOD FOR BONDING UNSATURATED AMORPHOUS OLEFINE COPOLYMERS BY ADDING COBALT SALT OR ORGANIC CARBOXYLIC ACID TO PROMOTE ADHESION
Cesare Canevari, Milan, Italy, assignor to Pirelli, S.p.A., Milan, Italy
Filed Oct. 3, 1966, Ser. No. 583,621
Claims priority, application Italy, Oct. 4, 1965, 22,090/65
Int. Cl. B32b 15/04
U.S. Cl. 161—217                             7 Claims

ABSTRACT OF THE DISCLOSURE

A composite structure comprising a metal base of zinc and a vulcanized elastomeric composition containing from 5 to 20% by weight of a cobolt salt of an organic carboxylic acid and sulfur in the range of from 3.5 to 7 parts by weight, the elastomer comprising a low unsaturated amorphous olefin copolymer of ethylene with alpha-olefins, and with at least one diene.

---

Figure 1:
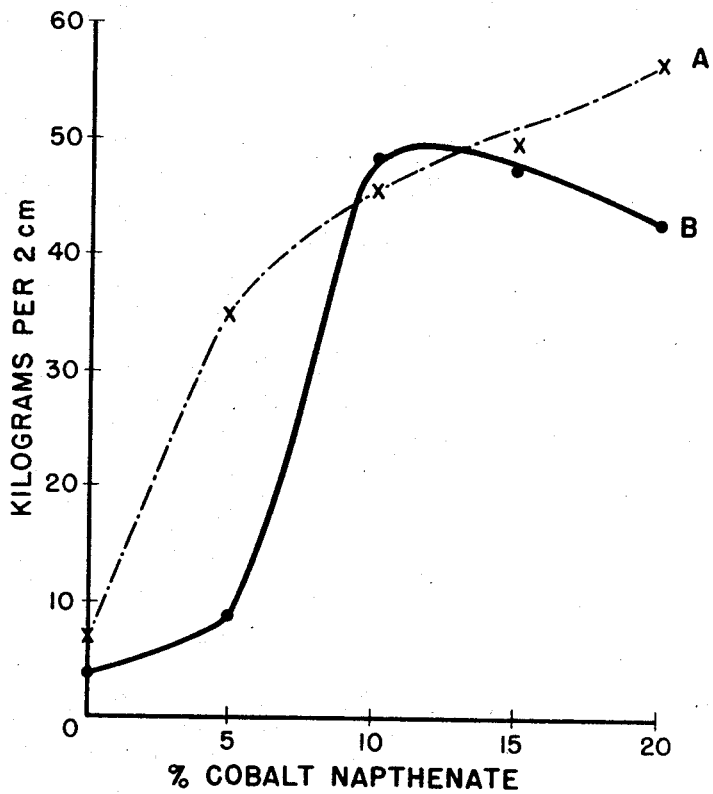

The present invention relates to a method for bonding to metal an elastomeric material comprising unsaturated amorphous olefins copolymers, and to the so obtained composite structure.

This method, based on the employment of cobalt organic salts in addition to the elastomeric composition, has proved particularly suitable for bonding to metal substantially linear, amorphous copolymers of high molecular weight constituted by ethylene, an alpha-olefine and at least one diene having or not having conjugated double bonds.

In the manufacture of rubber articles, as for instance solid or semi-pneumatic tires for vehicles, transmission belts and conveyor belts provided with metal reinforcements, tubes provided with reinforcing metal wires or cords, pneumatic tires and in general in the manufacture of all the rubber articles in which the rubber is reinforced with metal, it is necessary to provide a very firm bond between the metal and the rubber composition in order to ensure good performance and long life of the obtained article.

It is known that a method for providing adhesion between metal and highly unsaturated rubbers, as for instance natural rubber, polybutadiene, polyisoprene, butadiene-styrene rubber, is based on the employment of cobalt organic salts in addition to the rubber composition. Said method, however, has proven quite insufficient to ensure the adhesion between metal and low unsaturated rubbers, as for instance butyl rubber.

It has now been found that, contrary to what is expected, the bonding method based on the employment of cobalt organic salts proves to be extremely efficient as regards the adhesion between metal and low unsaturated elastomers, as for instance the amorphous olefins copolymers constituted by ethylene, an alpha-olefine and at least one diene, if the cobalt organic salt is present in the elastomeric composition in a specific amount. In fact, it has been noted that, whilst the employmentt of a cobalt organic salt—both in the small amounts generally used to bond highly unsaturated rubbers to metal and also in greater amounts—does not give a satisfactory bond in respect of the low unsaturated rubbers, as for instance butyl rubber, comparatively high amounts of said salt give rise to a remarkable improvement of the adhesion originated during the vulcanization between the unsaturated amorphous copolymer of the above indicated new class and the metal.

Moreover, it has been noted that in order to obtain good adhesion between said type of elastomer and the metal, a vulcanizing agent constituted by sulphur has a remarkable influence, if it is used in particular amounts.

The object of the present invention is a method for bonding to metal a vulcanizable composition, in which the basic elastomeric material is constituted by a low unsaturated amorphous olefins copolymer deriving from the copolymerization of ethylene with an alpha-olefine and with at least one diene, having or not having conjugated double bonds. Said method comprises the steps of adding to the vulcanizable composition a cobalt salt of an organic carboxylic acid, in an amount ranging between 5% and 20% by weight with respect to the elastomeric material, said composition containing sulphur as a vulcanizing agent in an amount ranging between 3.5 and 7 parts by weight, of placing said composition in contact with the metal, said metal being constituted by zinc at least on the surface to be bonded to the composition, and of subjecting the so obtained composite structure to vulcanization.

A further object of the present invention is the composite structure comprising a metal base constituted by zinc at least on the bonded surface, and a vulcanized elastomeric composition in which the basic elastomeric material is constituted by low unsaturated amorphous olefin copolymer, said composition containing a cobalt salt of an organic carboxylic acid and sulphur in the above indicated amounts.

The low unsaturated amorphous olefine copolymers indicated in the present specification as the elastomeric material are products deriving from the copolymerization of ethylene with an alpha-olefine and with at least one diene, having or not having conjugated double bonds, according to methods known to the technicians of the art. Copolymers of the instant type and means for preparing the same are, for example, disclosed in U.S. Pat. 3,260,708 to Natta et al. and assigned to Montecatini Societa Generale per l'Industrial Mineraria e Chemica. The alpha-olefine is generally constituted by propylene or butene-1. The third type of monomer is preferably an aliphatic or cyclic hydrocarbon diene which may be selected among the following compounds: butadiene, isoprene, 2,3-dimethylbutadiene, in the class of the dienes having conjugated double bonds; and, for instance, 1,4-pentadiene, 2-methyl-1,4-pentadiene, 1,5-hexadiene, 2-methyl-1,5-hexadiene, 1,4-hexadiene, 1,4-heptadiene, 1,5-heptadiene, 1,5-octadiene, dicyclopentadiene, 2-methylen-2,5-norbornene, 4,7,8,9-tetrahydromethylindene, selected in the class of the dienes having non conjugated double bonds.

The portions of the various monomers employed in the preparation of the low unsaturated amorphous olefine copolymers may be varied over wide ranges depending upon the desired properties. It is preferred that the polymer contain monomeric units in such amounts that the ethylene ranges between 20 and 71 mol percent, the alpha-olefine ranges from 15 to 78 mol percent and the conjugated or unconjugated diene ranges from 1 to 15 mol percent.

Said olefine copolymers can be used even when they are of the oil-extended type, since the method of the present invention applied to said oil-extended copolymers is equally good in providing good adhesion to the metal.

The elastomeric material is compounded with the conventional ingredients, fillers and additives, accelerators, plasticizers, anti-oxidants in the usual amounts, as generally made for the preparation of a vulcanizable composition based on an unsaturated amorphous olefine copolymer of the above indicated class. According to the present invention, the cobalt salt of organic carboxylic acid is added to the elastomeric composition; said addition is made according to the usual methods, either before or after the addition of the other ingredients. The cobalt salt of organic carboxylic acid is selected from among linoleate, stearate, oleate, acetate and naphthenate, the latter being the preferred compound.

The results of adhesion tests carried out in order to establish the limit values of the added cobalt organic salt have demonstrated that it is necessary to use at least 5% by weight of said compound, with respect to the elastomeric content of the composition to ensure between the unsaturated amorphous olefine copolymer and the metal an adhesion sufficient to allow practical application of the so obtained composite structure. It has moreover been noted that the addition of an amount of cobalt organic salt higher than 20% gives rise to technological difficulties without producing much improvement in the adhesion. Preferably, the elastomeric composition contains cobalt organic salt in an amount ranging from 10% to 15% by weight with respect to the elastomeric content.

The elastomeric composition comprising the unsaturated amorphous olefine copolymer usually contains sulphur as a vulcanizing agent. It has been noted that the amount of sulphur added to the composition also has a remarkable influence on the adhesion between the elastomer and the metal. In particular, amounts of sulphur ranging between 3.5 and 7 parts by weight have proved advantageous as regards improvement of the adhesion characteristics.

The metal, or at least the metallic surface to which the elastomeric composition is vulcanized, is constituted by zinc. Of course, the metal could also be steel, iron, aluminium, etc., provided that the surface intended to adhere to the elastomer is plated with zinc.

The elastomeric material based on the unsaturated amorphous olefine copolymer and containing the cobalt organic salt and sulphur in the above indicated percentages is applied directly on the zinc surface without the need of a pretreatment of said surface. The composite structure constituted by the elastomeric composition and the metal is then subjected to vulcanization.

The improvements of the adhesion characteristics between the olefine elastomer and the metal, which can be obtained according to the method forming the object of the present invention, will be more clearly illustrated by means of the following examples which are not limiting on the invention.

EXAMPLE 1

A vulcanizable composition based on an unsaturated amorphous olefine copolymer is prepared. In particular, use is made of the terpolymer constituted by ethylene-propylene-cyclo-octadiene sold by Montecatini, Societa Generale per l'Industria Mineraria e Chemica, under the trade name "Dutral S." Table 1 reports the ingredients of the composition, in which the parts are expressed by weight:

TABLE 1

Composition $A_1$

| | Parts by weight |
|---|---|
| Terpolymer | 100 |
| Mercaptobenzothiazole | 0.5 |
| Tetramethylthiuram disulphide | 1.5 |
| Zinc oxide | 5 |
| HAF carbon black | 60 |
| Stearic acid | 1 |
| Sulphur | 3.5 |

Four compositions based on said terpolymer are also prepared, which contain, besides the above defined ingredients in the above indicated amounts, also 5, 10, 15 and 20 parts of cobalt naphthenate respectively.

Said compositions are indicated as composition $A_2$, $A_3$, $A_4$ and $A_5$. Then specimens for the adhesion test are prepared with said compositions. The specimens are constituted by a block of each composition; they have a cylindrical shape, a diameter of 1 cm. and a height of 2 cm. and inside them, in axial position and projecting from the rubber, a tire cord made of zinc plated steel and constituted by 7 strands of three wires each, the diameter of each wire being 0.20 mm., is inserted. The outer part of the specimen is provided with a metallic cylinder. The specimens are subjected to vulcanization at a temperature of 160° C. for 120 minutes. Tests for evaluating the resistance of the specimens to a "pulling force" are then carried out. The particular shape of the specimens allows the vulcanized rubber disposed between the cord in axial position and the metallic cylinder to be subjected during the pulling test to a shear stress which is practically uniform along the cord. This test was adopted since it was ascertained that in a specimen according to the H-test the shear stresses are not uniform along the cord owing to the simultaneous occurrence of compression stresses due to the deformation of the block of the H-test in the direction of its height. In this case the non-uniformity of the shear stresses prevents an accurate evaluation of the metal-rubber bonding. The obtained results, expressed in kg./2 cm., are the following:

| Composition: | Kg./2 cm. |
|---|---|
| $A_1$ | 6.6 |
| $A_2$ | 35 |
| $A_3$ | 46 |
| $A_4$ | 50 |
| $A_5$ | 57 |

It is therefore evident that progressively increasing additions of cobalt naphthenate have a clear influence on the adhesion force between the olefine elastomer and the metal.

EXAMPLE 2

The tests described in Example 1 are repeated on composite structures constituted by zinc plated metal and by vulcanized compositions: in this case said compositions are based on oil-extended ethylene-propylene-diene. The same terpolymer used in Example 1 is employed; the product is constituted by 75 parts of ethylene-propylene-cyclooctadiene and by 25 parts of oil. The vulcanizable compositions based on said oil-extended terpolymer contain the same percentage of ingredients indicated in Example 1. In particular, corresponding to the vulcanized compositions indicated in the preceding example, compositions $B_1$, $B_2$, $B_3$, $B_4$ and $B_5$ are prepared, the first of which does not certain cobalt naphthenate, whilst the others contain 5, 10, 15 and 20 parts of said compound based on 100 parts of oil-extended terpolymer. Specimens are prepared with said compositions according to the above indicated method; tests of resistance to the "pulling force" are carried out on said specimens after having vulcanized them at 160° C. for 120 minutes.

The obtained results are:

| Composition: | Kg./2 cm. |
|---|---|
| $B_1$ | 3.6 |
| $B_2$ | 8.3 |
| $B_3$ | 49 |
| $B_4$ | 48 |
| $B_5$ | 43 |

It is therefore evident that also with respect to compositions of the oil-extended olefine copolymer a considerable improvement is obtained in their bonding to the metal by means of the addition of cobalt naphthenate.

In order to better demonstrate said improvement the results of the "pulling" tests obtained on the compositions described both in Example 1 and in Example 2 are reported in the diagram in FIG. 1, in which the pulling force expressed in kg./2 cm. is indicated in the ordinates, whilst the percentages of cobalt naphthenates present in the two types of elastomeric compositions respectively based on normal terpolymer and oil-extended terpolymer are indicated in the abscissae.

The two types of compositions, in accordance with the already adopted denominations, are indicated as A and B.

As can be seen from examination of the resulting curves, the presence of cobalt naphthenate in appropriate amounts is critical in order to obtain good adhesion between the olefine elastomer and the metal.

As regards the vulcanizable compositions based on the oil-extended olefine terpolymer, it can moreover be noted that the most efficient adhesion is obtained with a percentage of 10 parts of cobalt naphthenate, whilst higher amounts involve a slight decrease of the adhesion force.

EXAMPLE 3

This example illustrates the improvements of the bond between the unsaturated amorphous olefine terpolymer and the zinc plated metal obtained by using cobalt naphthenate and specific amounts of sulphur.

For this purpose a vulcanizable composition $C_1$ based on the ethylene-propylene-cyclooctadiene terpolymer is prepared. The following table reports the ingredients of the composition, in which the parts are expressed by weight.

TABLE 2

Composition $C_1$

| | Parts by weight |
|---|---|
| Terpolymer 100 | 100 |
| Mercaptobenzothiazole | 0.5 |
| Tetramethylthiuram disulphide | 1.5 |
| Zinc oxide | 5 |
| HAF carbon black | 60 |
| Stearic acid | 1 |
| Sulphur | 1.75 |

Two compositions based on the same teropolymer are also prepared in accordance with the above table, but containing sulphur in amounts of 3.5 and 7 parts, respectively, based on 100 parts of the elastomer. Said compositions are indicated as $C_2$ and $C_3$. Similar compositions, containing, besides the above indicated amounts, cobalt naphthenate in a percentage of 10 parts based on 100 parts of the basic terpolymer, are prepared. Said compositions, in accordance with the already adapted denominations, are indicated as $C_1'$, $C_2'$ and $C_3'$ and contain 1.75, 3.5 and 7 parts of sulphur, respectively. Specimens for the pulling tests carried out with the cords of zinc plated steel in accordance with the manner indicated in Example 1, are prepared with said compositions. The specimens are subjected to a vulcanization treatment at a temperature of 160° C. for 120 minutes.

The obtained results are:

| Composition: | Kg./2 cm. |
|---|---|
| $C_1$ | 4 |
| $C_2$ | 10 |
| $C_3$ | 10 |
| $C_1'$ | 29 |
| $C_2'$ | 48 |
| $C_3'$ | 63 |

As can be seen, the best results of adhesion between the olefin terpolymer and the metal are obtained with compositions containing a higher amount of sulphur.

EXAMPLE 4

The tests described in the preceding example are repeated on composite structure constituted by zinc plated metal and vulcanized composition in which the compositions are based on oil-extended ethylene-propylene-diene. The same terpolymer indicated in Example 2 is used, which is constituted by 75 parts of ethylene-propylene-cyclooctadiene and by 25 parts of oil. In particular, corresponding to the vulcanizable compositions of the preceding example, compositions $D_1$, $D_2$, $D_3$, $D_1'$, $D_2'$ and $D_3'$ are prepared according to the recipe indicated above, which is reported in Table 3 for the sake of clearances.

TABLE 3

| | Composition | | | | | |
|---|---|---|---|---|---|---|
| | $D_1$ | $D_2$ | $D_3$ | $D_1'$ | $D_2'$ | $D_3'$ |
| Oil-extended terpolymer | 100 | 100 | 100 | 100 | 100 | 100 |
| Mercaptobenzothiazole | 0.5 | 0.5 | 0.5 | 0.5 | 0.5 | 0.5 |
| Tetramethylthiuram disulphide | 1 | 1 | 1 | 1 | 1 | 1 |
| Cobalt naphthenate | | | | 10 | 10 | 10 |
| Zinc oxide | 5 | 5 | 5 | 5 | 5 | 5 |
| HAF carbon black | 60 | 60 | 60 | 60 | 60 | 60 |
| Sulphur | 1.75 | 3.5 | 7 | 1.75 | 3.5 | 7 |
| Stearic acid | 1 | 1 | 1 | 1 | 1 | 1 |

Speciments for the pulling tests carried out with the cords of zinc plated steel in accordance with the means indicated above are prepared with said compositions. The specimens are subjected to a vulcanization treatment at a temperature of 160° C. for 120 minutes.

The obtained results are:

| Composition: | kg./2 cm. |
|---|---|
| $D_1$ | 4 |
| $D_2$ | 3.6 |
| $D_3$ | 4 |
| $D_1'$ | 13 |
| $D_2'$ | 49 |
| $D_3'$ | 52 |

From said results it is evident that also as regards the bonding between the oil-extended olefine terpolymer and the metal, the efficiency of said bonding, due to the cobalt naphthenate, is remarkably affected by the amount of sulphur present in the composition.

Figure 2:
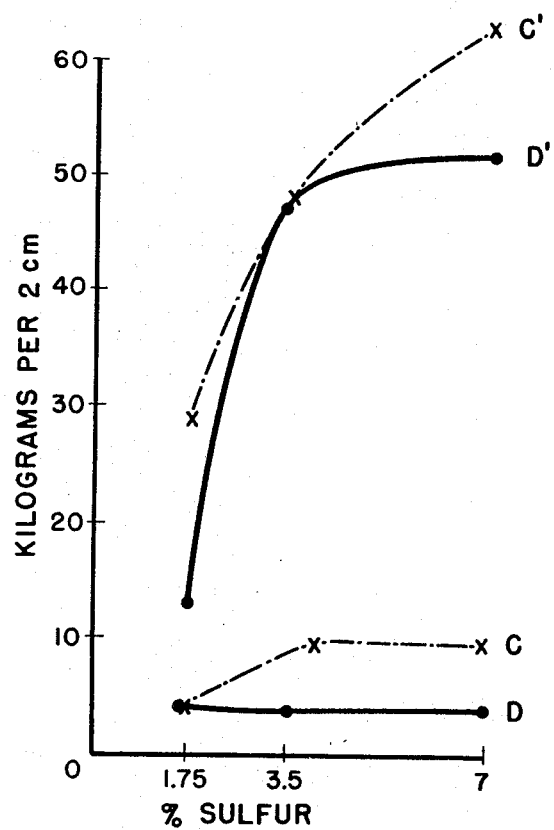

In order to better demonstrate said improvement, the results of the bonding tests obtained on the compositions described both in this example and in the preceding one, are reported in the diagram of FIG. 2, in which the pulling force, expressed in kg./2 cm. is indicated in the ordinates, whilst the percentages of sulphur present in the two types of elastomeric compositions C' and D' respectively based on a normal olefine terpolymer and on an oil-extended olefine terpolymer, both having the same ingredients and containing 10 parts of cobalt naphthenate and in the two types of elastomeric compositions C and D respectively based on a normal olefine terpolymer and an oil-extended olefine terpolymer, both having the same ingredients and without the addition of cobalt naphthenate, are indicated in the abscissae. From the so obtained curves it is evident that the simultaneous presence of stated amounts of sulphur and cobalt naphthenate is critical for obtaining said adhesion.

EXAMPLE 5

This example is directed in particular to demonstrate how the improvement in the bond between the compositions based on unsaturated amorphous olefine copolymer and the metal, obtained according to the present invention, is achieved independently of the type of olefine terpolymer used.

For this purpose five vulcanizable compositions are prepared, each based on a different olefine terpolymer. In particular, besides the vulcanizable composition based on the ethylene-propylene-cyclooctadiene terpolymer, used in all the preceding examples, the following vulcanizable compositions are prepared: a vulcanizable composition based on the unsaturated amorphous olefine copolymer having a high Mooney viscosity and sold by Du Pont de Nemours under the tradename "Nordel 1070"; a third vulcanizable composition based on the unsaturated amorphous olefine terpolymer having a low Mooney viscosity and sold by Du Pont de Nemours under the tradename "Nordel 1040"; a fourth vulcanizable composition based on the unsaturated amorphous olefine terpolymer sold by Naugatuck Co. under the tradename "Royalene 200"; and a fifth vulcanizable composition based on the unsaturated amorphous olefine terpolymer having a low Mooney viscosity and sold by Naugatuck Co. under the tradename of "Royalene X 301."

The common recipe for all these compositions is the following:

TABLE 4

| | Parts by weight |
|---|---|
| Terpolymer | 100 |
| Mercaptobenzothiazole | 0.5 |
| Tetramethylthiuram disulphide | 1.5 |
| Zinc oxide | 5 |
| HAF carbon black | 60 |
| Stearic acid | 1 |
| Cobalt naphthenate | 15 |
| Sulphur | 3.5 |

The compositions respectively based on "Dutral S," "Nordel 1070," "Nordel 1040," "Royalene 200" and "Royalene X 301" are indicated as $E_1$, $E_2$, $E_3$, $E_4$, $E_5$. Specimens prepared from said compositions according to the above indicated method are subjected to a vulcanization treatment at 160° C. for 120 minutes.

The obtained results are:

| Composition: | kg./2 cm. |
|---|---|
| $E_1$ | 52 |
| $E_2$ | 52 |
| $E_3$ | 43 |
| $E_4$ | 62 |
| $E_5$ | 59 |

It is therefore evident that there is not a considerable difference in the effectiveness of the bond between vulcanizable compositions based on unsaturated amorphous olefine terpolymer and zinc plated metal, whatever the basic olefine terpolymer used.

What is claimed is:

1. A method for bonding a vulcanizable composition based on elastomeric material to metal, the metal being constituted by zinc at least on the surface to be bonded to the vulcanizable composition, which comprises the steps of: adding to the vulcanizable composition a cobalt salt of an organic carboxylic acid in an amount ranging between the 5% and the 20% by weight with respect to the elastomeric material, said vulcanizable composition containing sulphur in an amount ranging between 3.5 and 7 parts by weight, placing said composition in contact with the zinc surface to which it has to adhere, and of subjecting the so obtained composite structure to vulcanization, the elastomeric material being constituted by a low unsaturated amorphous olefine copolymer deriving from the copolymerization of ethylene with an alpha-olefine and with at least one diene, having or not having conjugated double bonds.

2. A method according to claim 1 in which the copolymer is oil-extended.

3. A method according to claim 1 in which said cobalt salt is cobalt naphthenate in an amount between 10 to 15% by weight with respect to the elastomeric material.

4. A method according to claim 1 in which the alpha-olefine is propylene.

5. A method according to claim 1 in which the low unsaturated amorphous copolymer comprises 20 to 71 mol percent ethylene, 15 to 78 mol percent alpha-olefine and 1 to 15 mol percent diene.

6. A composite structure, comprising a metal base constituted by zinc at least on the bonded surface, and a vulcanized elastomeric composition containing a cobalt salt of an organic carboxylic acid in an amount ranging between 5% and 20% by weight with respect to the elastomer, and sulphur in an amount ranging between 3.5 and 7 parts by weight, the basic elastomer of the composition being a low unsaturated amorphous olefine copolymer derived from the copolymerization of ethylene with an alpha-olefine and with at least one diene, having or not having conjugated double bonds.

7. A composite structure according to claim 6 wherein said copolymer is oil-extended.

References Cited

UNITED STATES PATENTS 3,347,817 10/1967 Gladding et al. 161—217
5,354,107 11/1967 Hamed 260—31.2

OTHER REFERENCES

Wojcicki: Chemical Abstracts, vol. 63, p. 5857g, 1965.

JOHN T. GOOLKASIAN, Primary Examiner

J. D. SMITH, Assistant Examiner

U.S. Cl. X.R.

161—221; 260—80.7, 80.78, 23.5, 23.7

PO-1050
(5/69)

UNITED STATES PATENT OFFICE
CERTIFICATE OF CORRECTION

Patent No. 3,514,370      Dated May 26, 1970

Inventor(s) Cesare CANEVARI

It is certified that error appears in the above-identified patent and that said Letters Patent are hereby corrected as shown below:

Column 1, line 65, change "employmentt" to -- employment --.
Column 5, line 39, change "teropolymer" to -- terpolymer --;
         line 42, after "above" insert -- defined ingredients in the above --;
         line 46, change "adapted" to -- adopted --.
Column 6, line 3, change "clearances" to -- clearness --;
         line 15, change "speciments" to -- specimens --;
         line 66, change "coploymer" to -- copolymer --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents